United States Patent Office 2,913,472
Patented Nov. 17, 1959

2,913,472
GRIGNARD REACTION OF CYANOALKYLSILANES IN THE PRESENCE OF TERTIARY AMINES

Maurice Prober, Schenectady, N.Y., assignor to General Electric Company, a corporation of New York No Drawing. Application May 20, 1957
Serial No. 660,074

6 Claims. (Cl. 260—448.2)

This invention relates to a process for substituting a hydrocarbon radical for a silicon-bonded hydrolyzable radical of an organopolysiloxane containing both a silicon-bonded cyanoalkyl radical and a silicon-bonded hydrolyzable radical.

In recent years organosilicon compounds have obtained wide commercial acceptance as industrial materials because of the superior thermal stability of these compounds over conventional organic materials. These organosilicon compounds may be converted into polymeric materials which are useful as lubricants, lubricant additives, elastomers, and resins. Among the newer organosilicon compounds are hydrolyzable silanes containing one or more silicon-bonded, cyanoalkyl radicals. Hydrolyzable silanes containing silicon-bonded cyanoalkyl radicals may be converted by conventional means into polymeric fluids, resins and elastomers with lubricating, solvent resistance and physical properties superior to the properties of corresponding organopolysiloxanes in which all of the organo groups are hydrocarbon radicals.

In order to obtain a full spectrum of organosilicon compounds and organopolysiloxanes containing a silicon-bonded cyanoalkyl radical, it is necessary to have as starting materials organosilicon compounds containing at least one cyanoalkyl radical and a number of silicon-bonded hydrolyzable radicals which varies from 0 to 3. The need for the variable number of hydrolyzable silicon-bonded radicals occurs because each type of organosilane is particularly valuable in the formation of a particular type of end product. Thus, organosilicon compounds containing three silicon-bonded hydrolyzable radicals are particularly valuable in the formation of organopolysiloxane resins. Those compounds containing two silicon-bonded hydrolyzable radicals are particularly valuable in the formation of organopolysiloxane elastomers. Those compounds containing one hydrolyzable radical are particularly valuable in the formation of linear chain-stopped organopolysiloxane fluids.

In order to have a full spectrum of organosilicon compounds available, it is convenient to have one type of hydrolyzable organosilicon compound available which may be converted to other hydrolyzable organosilicon compounds with a different number of silicon-bonded hydrolyzable groups. Thus, it is very desirable to have as an available starting material an organosilicon compound containing three hydrolyzable groups and to have a method for the conversion of this compound to other organosilicon compounds containing fewer hydrolyzable groups.

In the past it has been possible to convert an organosilicon compound such as methyltrichlorosilane to dimethyldichlorosilane or trimethylchlorosilane by reacting methyltrichlorosilane with a methyl Grignard reagent which serves to alkylate the silicon atom. However, when an attempt is made to alkylate a compound containing a silicon-bonded cyanoalkyl radical, such as, for example, β-cyanoethyltrichlorosilane, the presence of the nitrile radical in the compound interferes with the alkylation and results in a very poor yield of products such as methyl-β-cyanoethyldichlorosilane and dimethyl-β-cyanoethylchlorosilane.

It is an object of this invention to provide a process wherein a hydrocarbon radical may be substituted for a silicon-bonded hydrolyzable radical on an organosilicon compound containing both a cyanoalkyl radical and a silicon-bonded hydrolyzable radical.

This and other objects of my invention are accomplished by my process for substituting a hydrocarbon radical for the hydrolyzable group of an organopolysiloxane containing both a silicon-bonded cyanoalkyl radical and a silicon-bonded hydrolyzable radical, which process comprises effecting reaction between the hydrolyzable silane and a Grignard reagent, such as a hydrocarbonyl magnesium halide, in the presence of a tertiary amine.

The hydrolyzable cyanoalkyl silanes to which my process is applicable can be described generally as containing at least one silicon-bonded cyanoalkyl radical, at least one silicon-bonded hydrolyzable radical, with the remaining valences of silicon being satisfied by hydrocarbon radicals. These compounds are more particularly described by the following formula:

(1) $\qquad (X)_a(R)_b Si(R'CN)_{4-(a+b)}$ where X represents a hydrolyzable group selected from the class consisting of halogen, e.g., chlorine, bromine, iodine; acyloxy radicals, e.g., acetoxy, propionoxy, etc. radicals, alkoxy radicals, e.g., lower alkoxy radicals such as methoxy, ethoxy, propoxy, butoxy, heptoxy, etc. radicals, aryloxy radicals, e.g., phenoxy, alkyl-substituted phenoxy radicals, etc., R is a monovalent hydrocarbon radical, such as a lower alkyl radical, e.g., methyl, ethyl, propyl, butyl, heptyl, cyclohexyl, etc. radicals; an aryl radical, e.g., phenyl, naphthyl, diphenyl, tolyl, xylyl, etc. radicals; or an aralkyl radical, e.g., benzyl, phenyl ethyl, etc. radical; R' is a saturated divalent aliphatic hydrocarbon radical having from 1 to 7 carbon atoms, e.g., methylene, ethylene, propylene, isopropylene, ethylidine, etc. radicals; $a$ is a whole number having a value from 1 to 3, inclusive; $b$ is a whole number having a value of from 0 to 2, inclusive; and the sum of $a+b$ is a whole number equal to from 1 to 3, inclusive.

The hydrolyzable cyanoalkyl silanes within the scope of Formula 1 above may be prepared by a number of different methods. The most convenient method for preparing compounds within the scope of the formula which contain a silicon-bonded β-cyanoalkyl radical is the method described in my copending application Serial No. 401,702, filed December 31, 1953, and assigned to the same assignee as the present invention. In the method described in this copending application an organosilicon compound containing both silicon-bonded halogen and silicon-bonded hydrogen is added across the double bond of acrylonitrile or alkyl-substituted acrylonitrile in the presence of a tertiary alkyl amine. This results in a β-cyanoalkyl halogenosilane. For example, β-cyanoethyltrichlorosilane may be prepared by reacting trichlorosilane with acrylonitrile in the presence of tributylamine. Methyl-β-cyanopropyldichlorosilane may be prepared by reacting methyldichlorosilane with methylacrylonitrile in the presence of tributyl amine. These halogenosilanes may be converted to the corresponding alkoxysilane, aryloxysilane or acyloxysilane by reaction with a suitable alcohol, phenol, or organic acid salt.

Another method for forming the cyanoalkyl hydrolyzable silanes within the scope of Formula 1 is by the peroxide catalyzed addition of an organosilicon compound containing both silicon-bonded halogen and silicon-bonded hydrogen to a cyanoalkene. Thus, ω-cyanobutyltrichlorosilane may be prepared by effecting reaction between trichlorosilane and 4-cyanobutene-1 in the presence of a peroxide such as benzoyl peroxide or acetyl peroxide. Generally, this reaction is carried out at an elevated temperature in a bomb, temperatures of from 150–300° C. being satisfactory for the addition.

The hydrocarbonyl magnesium halides employed in the practice of the present invention are conventional Grignard reagents which have the general formula (2)  R″MgZ where R″ represents a hydrocarbon radical selected from the class consisting of lower alkyl radicals and aryl radicals, e.g., methyl, ethyl, propyl, butyl, heptyl, phenyl, benzyl, xylyl, etc. radicals; and Z is halogen, e.g., bromine, chlorine or iodine. These Grignard reagents are prepared by reacting a hydrocarbon halide of the formula (3)  R″Z where R″ and Z are as defined above with magnesium turnings in an ether solution by conventional methods. The tertiary amines which may be employed in the process of this invention are generally hydrocarbon amines containing only carbon, hydrogen and nitrogen. Suitable amines include trialkyl amines such as trimethyl amine, triethyl amine, tributyl amine, dimethylethyl amine, dimethylcyclohexyl amine; triaryl amines, such as triphenyl amine, tritolyl amine, trinaphthyl amine; alkylaryl amines, e.g., dimethyl phenyl amine, benzyldimethyl amine, butyldiphenyl amine, etc.; heterocyclic amines, e.g., pyridine, quinoline, N-substituted piperidine such as N-methyl piperidine; diamines, e.g., N,N,N′,N′-tetramethylethylenediamine, etc. In addition, tertiary amines within the scope of the present invention include amines containing atoms other than carbon, hydrogen and nitrogen where the other atoms do not affect the characteristics of the amine. An example of this type of amine is N-ethylmorpholine.

The reaction of the present invention is effected by merely mixing the hydrolyzable cyanoalkyl silane of Formula 1 with the Grignard reagent of Formula 2 and the tertiary amine. The net effect of the reaction is to replace one or more of the silicon-bonded hydrolyzable groups of the silane of Formula 1 with the hydrocarbon radical which is present in the Grignard reagent of Formula 2. A typical illustration of a reaction within the scope of the present invention is the reaction of β-cyanoethyltrichlorosilane with methyl magnesium bromide in the presence of quinoline. The result of this reaction is to substitute one or more methyl radicals for the silicon-bonded chlorine atoms of the chlorosilane. Thus, products of the reaction are methyl-β-cyanoethyldichlorosilane, dimethyl-β-cyanoethylchlorosilane, and trimethyl-β-cyanoethylsilane. As a general rule, the reaction of the present invention leads to the substitution of only one of the silicon-bonded hydrolyzable radicals of the cyanoalkyl hydrolyzable silane. However, by-products of the reaction sometimes include products in which more than one of the silicon-bonded hydrolyzable radicals are replaced by hydrocarbon radicals.

The ratio of the ingredients employed in the process of the present invention may vary within fairly wide limits. However, it is preferred to have present equimolar amounts of the cyanoalkyl hydrolyzable silane, the Grignard reagent and the teriary amine. Satisfactory reactions are also obtained when the amount of Grignard reagent present is less than 1 mole per mole of the tertiary amine or of the cyanoalkyl hydrolyzable silane. Where less than 1 mole of the Grignard reagent is employed, I prefer to employ not less than one-half mole of the Grignard reagent per mole of the cyanoalkyl hydrolyzable silane. The amount of tertiary amine present in the reaction mixture may comprise more than one mole per mole of the Grignard reagent, for example, up to 2 moles of the tertiary amine per mole of the Grignard reagent.

In carrying out the reaction of the present invention, it is convenient to employ a solvent for the reaction mixture. Since the Grignard reagents are conventionally formed in diethyl ether, we prefer to use diethyl ether as the reaction solvent. The amount of solvent present per part of reactants is not at all critical. Generally, I employ for convenience about 1 to 100 parts, by weight, of solvent per part of reactants, where the term reactants is used to describe the hydrolyzable silane, the hydrocarbonyl magnesium halide and the tertiary amine. The conditions under which the reaction will proceed will vary again within extremely wide limits, e.g., from room temperature up to the boiling point of the particular solvent employed. For convenience, however, I prefer to carry out the reaction at the reflux temperature of the solvent, i.e., about 35° C., since the refluxing of the reaction mixture insures thorough agitation of the reactants and thus facilitates the reaction. Generally, the reaction is carried out at atmospheric pressure although it may be carried out at either subatmospheric or superatmospheric pressures. No particular advantage is gained by the use of other than atmospheric pressure.

The following examples are illustrative of the practice of my invention and are not intended for purposes of limitation.

Example 1

A Grignard reagent was prepared by reacting equimolar amounts of magnesium and methyl bromide in about 2 parts by weight of diethyl ether based on the weight of the magnesium and methyl bromide. This resulted in a solution of methyl magnesium bromide in ether. This Grignard reagent was added to a solution containing equimolar amounts of β-cyanoethyltrichlorosilane and pyridine in diethyl ether, with the ether being present in an amount equal to about 1.75 parts by weight per part by weight of the silane and pyridine. The Grignard reagent was added over a three hour period and regulated so that the total moles of methyl magnesium bromide added was equal to the number of moles of the silane. After completing the addition, the resulting mixture was refluxed for one and one-half hours and then stirred overnight at room temperature. This resulted in a liquid containing a precipitate. After removing the precipitate, the solvent was stripped off, the residue was vacuum distilled, and the material boiling between 78° to 95° C. at 4.5 mm. was collected. This distillate contained some unreacted β-cyanoethyltrichlorosilane as well as methyl-β-cyanoethyldichlorosilane, dimethyl-β-cyanoethylchlorosilane and trimethyl-β-cyanoethylsilane. Since these materials are not easily separated by rectification, they were converted to the corresponding ethoxy derivatives by adding substantially equal parts by weight of the chlorosilanes, anhydrous ethanol, and pyridine to about two parts of benzene and refluxing this mixture for 8 hours. At the end of this time the reaction product was filtered and the solvent distilled off. The residue was then vacuum distilled, yielding a product which boiled largely at 96 to 101° C. at 8 mm. This distillate was carefully fractionated to yield 36.9 percent of methyl-β-cyanoethyldiethoxysilane which boiled at 123–125.5° C. at 30 mm. and which contained 15.0 percent silicon as compared with the theoretical value of 15.0 percent silicon; 26.0 percent yield of dimethyl-β-cyanoethylethoxysilane which boiled at 106–108° C. at 30 mm. and contained 18.3 percent silicon as compared with the theoretical value of 17.9 percent silicon; and 4.7 percent yield of trimethyl-β-cyanoethylsilane which boiled at 77–82° C. at 30 mm. The yields described are based on the amount of Grignard reagent employed, since the Grignard reagent was the limiting ingredient in the reaction. Thus, it is seen that the reaction resulted in 67.6 percent yield of products in which a methyl group was substituted for a silicon-bonded halogen group.

When the procedure described above was repeated except that no tertiary amine was present in the reaction mixture, the maximum yield of β-cyanoethylsilanes containing silicon-bonded methyl groups was 14 percent, indicating that the addition of the tertiary amine, pyridine, to the reaction mixture resulted in an almost fivefold increase in the yield of product.

Example 2

Over a one hour period, a solution of methyl magnesium bromide in 2.4 parts by weight of diethyl ether was added to an equimolar mixture of β-cyanoethyltrichlorosilane and pyridine in 1.6 parts by weight of diethyl ether. The number of moles of methyl magnesium bromide added was equal to the number of moles of the silane. After refluxing this mixture for two hours, hydrogen chloride was bubbled into the reaction mixture and the resulting pyridine hydrochloride precipitate was filtered off. After distilling off the ether at 4.5 mm. the residue was distilled at 4.5 mm. and the fraction boiling between 76 and 80° C. was collected. This distillate was then fractionally distilled, yielding about 62 percent of methyl-β-cyanoethyldichlorosilane which boiled at about 84 to 86° C. at 8 to 10 mm. The methyl-β-cyanoethyldichlorosilane contained about 43 percent hydrolyzable chlorine as compared with the theoretical value of 42.2 percent. The yield described above was based on the amount of methyl magnesium bromide employed.

Although the foregoing examples have not specifically illustrated all of the various modifications of the process of the present invention, it is within the skill of the art to modify my process within the limits of pressure, temperature, reactant concentrations, and reaction conditions which have been previously described. In addition, the particular types of ingredients employed in my process are also variable within wide limits. Thus, cyanoalkylsilanes other than those particularly described, Grignard reagents other than those particularly described, and tertiary amines other than those particularly described may be employed in my process.

As previously mentioned, the cyanoalkylalkylsilanes of the present invention are useful in the preparation of organopolysiloxane fluids, resins and elastomers. These cyanoalkyl compounds may be incorporated into polymeric organopolysiloxanes by conventional methods. Thus, a compound such as methyl-β-cyanoethyldichlorosilane may be hydrolyzed with other silanes such as, for example, dimethyldichlorosilane, methyltrichlorosilane or trimethylchlorosilane to form the desired polymeric organopolysiloxanes.

What I claim and desire to secure by Letters Patent of the United States is:

1. The process for substituting a hydrocarbon radical for the hydrolyzable group of a hydrolyzable silane containing both a silicon-bonded cyanoalkyl radical and a silicon-bonded hydrolyzable radical in which the hydrolyzable radical is selected from the class consisting of halogen, lower alkoxy radicals, and acyloxy radicals, which process comprises effecting reaction between said hydrolyzable silane and a hydrocarbonyl magnesium halide in which the hydrocarbonyl group is selected from the class consisting of lower alkyl radicals and aryl radicals, and the halogen of the magnesium halide is selected from the class consisting of bromine, chlorine and iodine, in the presence of a tertiary amine containing only carbon, hydrogen and nitrogen, there being employed a molar ratio of from 0.5 to less than 1 mol of the hydrocarbonyl magnesium halide per mol of the hydrolyzable silane.

2. The method of claim 1 in which the tertiary amine is pyridine.

3. The method of claim 1 in which the hydrolyzable silane is β-cyanoethyltrichlorosilane.

4. The method of claim 1 in which the hydrocarbonyl magnesium halide is methyl magnesium bromide.

5. The method of substituting a methyl radical for at least one of the chlorine atoms of β-cyanoethyltrichlorosilane, which process comprises effecting reaction between β-cyanoethyltrichlorosilane and methyl magnesium bromide in the presence of pyridine, there being employed a molar ratio of from 0.5 to less than 1 mol of the methyl magnesium bromide per mol of β-cyanoethyltrichlorosilane.

6. The method of claim 1 in which the hydrocarbonyl magnesium halide is a methyl magnesium halide.

References Cited in the file of this patent

FOREIGN PATENTS 1,116,726    France _____ Feb. 6, 1956

OTHER REFERENCES

Petrov et al.: "Doklady Akad. Nauk," SSSR, vol. 100 (1955), pp. 711–714.

Kharasch et al.: "Grignard Reactions of Nonmetallic Substance," Prentice-Hall, Inc., New York, publishers (1954), pp. 36–38, 49–53, 141–142.